United States Patent
Childs et al.

(10) Patent No.: US 9,742,280 B2
(45) Date of Patent: Aug. 22, 2017

(54) DYNAMIC CLOCK DIVIDE FOR CURRENT BOOSTING

(71) Applicant: Dialog Semiconductor (UK) Limited, London (GB)

(72) Inventors: Mark Childs, Swindon (GB); Jens Masuch, Munich (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/175,301

(22) Filed: Jun. 7, 2016

(65) Prior Publication Data

US 2016/0365791 A1    Dec. 15, 2016

Related U.S. Application Data

(60) Provisional application No. 62/173,454, filed on Jun. 10, 2015.

(51) Int. Cl.
| H02M 3/158 | (2006.01) |
|---|---|
| H02M 1/08 | (2006.01) |
| H02M 1/00 | (2006.01) |

(52) U.S. Cl.
CPC ............. *H02M 3/158* (2013.01); *H02M 1/08* (2013.01); *H02M 3/1584* (2013.01); *H02M 2001/0009* (2013.01); *H02M 2003/1586* (2013.01)

(58) Field of Classification Search
CPC ...... H02M 3/158; H02M 3/1584; H02M 1/08; H02M 2001/0009; H02M 2003/1586
See application file for complete search history.

(56) References Cited

U.S. PATENT DOCUMENTS

| 2014/0062433 A1* | 3/2014 | Zhou | ..................... H02M 3/158 323/271 |
|---|---|---|---|
| 2014/0333270 A1* | 11/2014 | Young | ................. H02M 3/1584 323/234 |

* cited by examiner

*Primary Examiner* — Jue Zhang
(74) *Attorney, Agent, or Firm* — Saile Ackerman LLC; Stephen B. Ackerman

(57) ABSTRACT

In order to accelerate the response of buck converters to load transients buck converters having asymmetric phase designs having a load step detection are used. When a relatively large and fast load step is detected, the clock frequency of "fast" valley mode phases is reduced, which are populated with fast, low value inductors. The clock frequency is returned to its normal rate when the current in the "slow" phases has reached a suitable level.

17 Claims, 4 Drawing Sheets

DYNAMIC CLOCK DIVIDE FOR CURRENT BOOSTING

BACKGROUND

Technical Field

The present document relates to hybrid buck architecture which combines phases using peak current control mode with phases using valley current control mode.

Background

Especially in mobile electronic devices such as smart phones, tablet computers, etc. DC-to-DC power converters such as buck converters, have to respond quickly to fast load transients in order to ramp up output current accordingly and respond adequately to changes in load. Load can vary by a high percentage within fractions of a second.

It is a challenge for the designers of buck converters to adapt the buck converters to this demanding requirement of mobile electronic devices.

SUMMARY

A principal object of the present disclosure is to improve load transient response of buck converters.

A further object of the disclosure is to detect when a load transient has occurred and allow the fast slave phases to ramp up their current more quickly and better respond to changes in load.

A further object of the disclosure is to operate in a closed loop system to ensure the buck can still respond to changing conditions and does not give erroneous behavior.

A further object of the disclosure is to deploy a multiphase buck converter allowing fast phases to "fill in" for slower phases that might still be operating open-loop.

A further object of the disclosure is to implement a fast load-detection scheme.

SHORT DESCRIPTION OF THE FIGURES

The invention is explained below in an exemplary manner with reference to the accompanying drawings, wherein FIG. 1 shows an example of an asymmetric phase design scheme is used to create a hybrid buck converter architecture. In this scheme we define a master phase, which will operate at low loads. This master phase will use peak mode control and support discontinuous mode operation.

Figure 5:
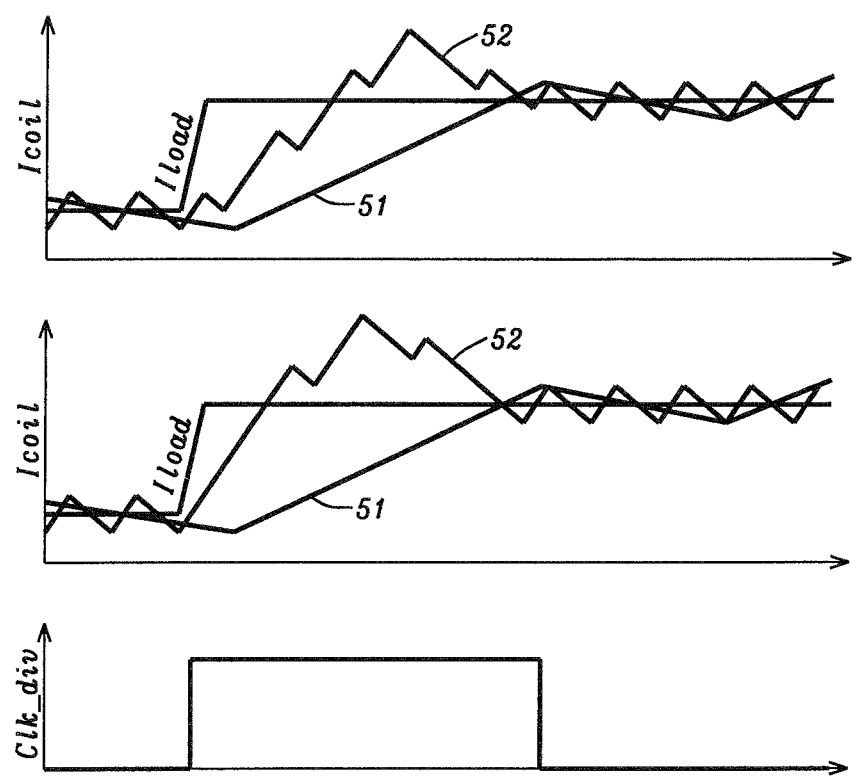

FIG. 5 shows how the scheme works. The top panel shows the situation without load step detection. The second panel shows the case with the load step detection disclosed and the third panel shows the time period for which the clock would be halved.

Figure 6:
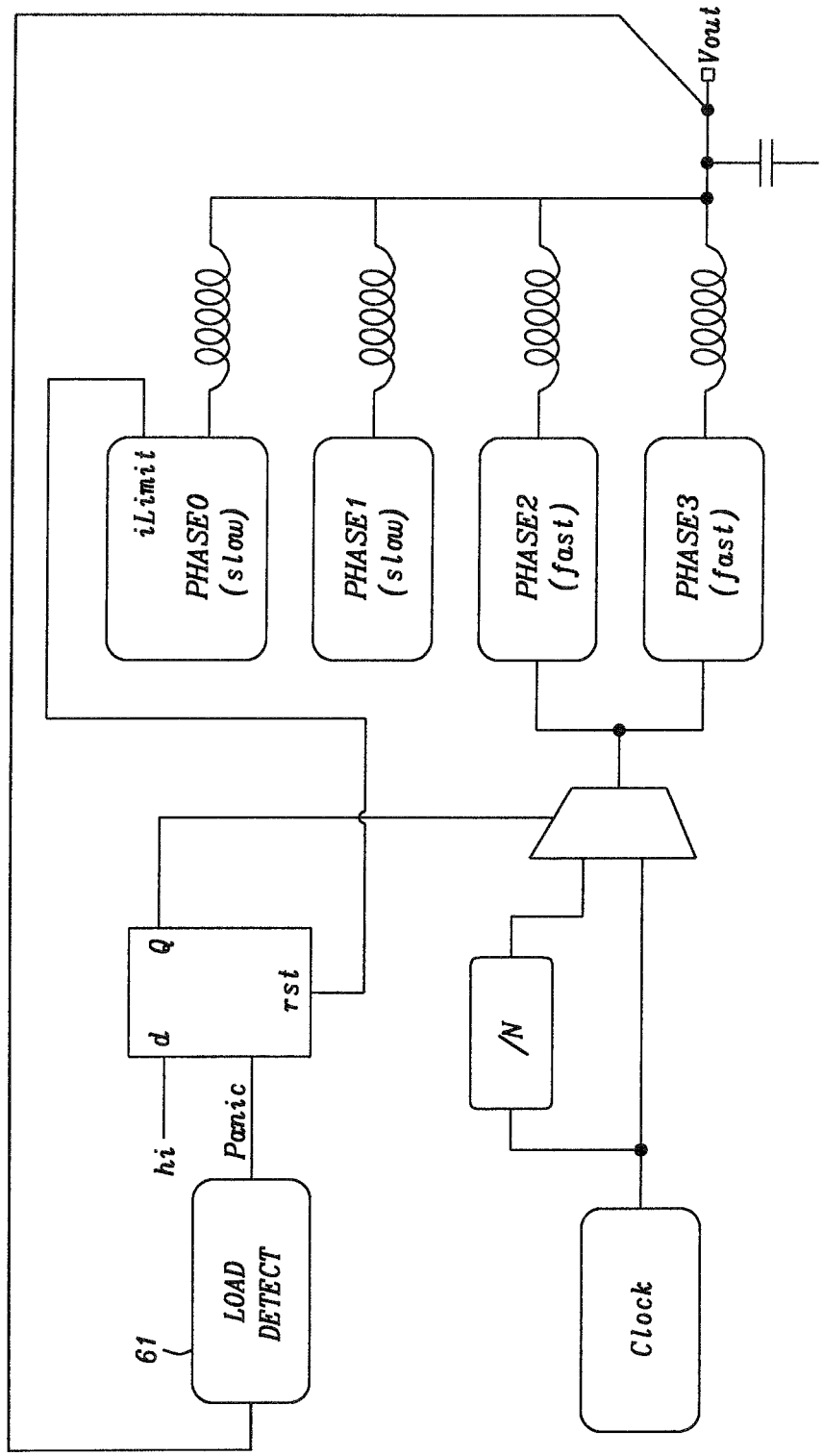

FIG. 6 shows a block diagram of a preferred embodiment of the disclosure. It shows an embodiment having two slow and two fast phases including a load detection unit.

DETAILED DESCRIPTION

In order to achieve fast response to load transients buck converters having asymmetric phase designs are used. In these designs the buck converters optimize the phases for different operating conditions. So, for example, the master phase will be optimized for very low load conditions, offering very high efficiency at low loads. Only the master phase will operate at low load conditions. The slave phases may then be optimized for efficiency at high load and load transient response. These phases are only enabled at high loads.

This asymmetric phase design scheme is used to create a hybrid buck converter architecture which combines phases using peak current control mode with phases using valley current control mode.

Figure 1:
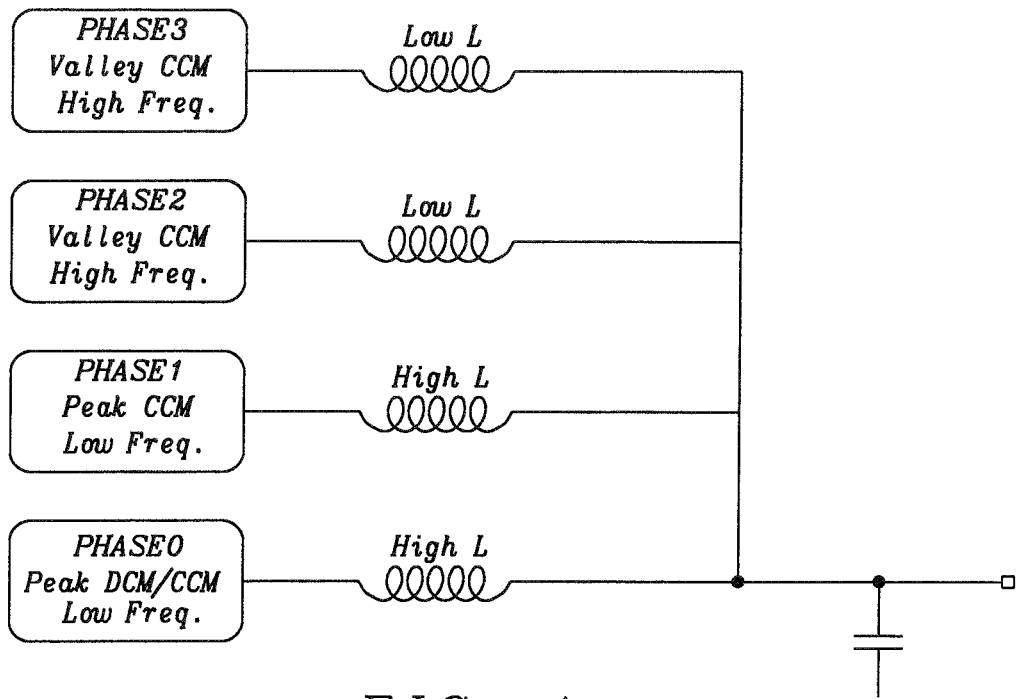

FIG. 1 shows an example of such architecture. In this scheme we define a master phase, which will operate at low loads. This master phase will use peak mode control and support discontinuous mode operation.

Then a slave phase is defined, which will operate at high loads. This phase will not support DCM but will operate only in continuous conduction mode (CCM). This simplifies the valley mode phase design substantially.

The master phase would then typically use a much lower switching frequency and a much larger and higher value inductor. The slave phase would then typically use a much higher switching frequency and a much smaller value inductor.

There is no limit to how many master and slave phases can be defined. Multiple masters phases may operate at different frequencies and with different coil values. Multiple slave phases may operate at different frequencies and with different coil values. Not all peak mode phases must support DCM operation (but at least one peak mode phase should).

For high switching frequency, valley current mode control is more practical. In this scheme an NMOS transistor is turned on by the clock and turned off by a control loop. A PMOS transistor on-time is then defined only by the turn-off of the NMOS transistor and the clock. This scheme allows much higher switching frequencies.

The number of phases enabled at any time is dependent on the total output current of the buck. This value is time-averaged over a window, which makes this measurement relatively slow. In order to react quickly to a load step a fast mechanism is implemented to immediately enable all phases if the load is sufficiently large. This fast detection mechanism is colloquially referred to as "panic" signal.

Adding this panic signal allows the buck converter to respond quickly to a fast load transient. It has to be understood that valley control limits the response of a phase to a load step. In valley control the PMOS transistor is turned off when a clock edge occurs. In the event of a load step the inductor current must rise to meet the load. The best way to achieve this is to turn the PMOS transistor on and hold it on until the current exceeds the load requirement.

However, the requirement to turn off the PMOS each clock cycle will reduce the effective ramp rate of the valley phase coil current.

Figure 2:
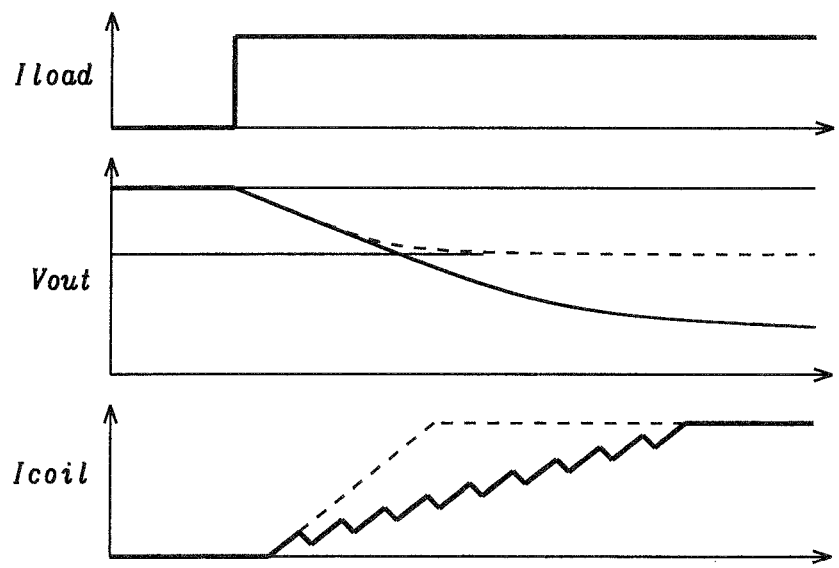
FIG. 2 shows how the requirement to turn off the PMOS each clock cycle reduces the effective ramp rate of the valley phase coil current wherein in the first panel a load step occurs; the output voltage then falls in the second panel, and the phase responds by turning on the high-side device causing the current in the coil to rise. The third panel shows the current through the coil.

This is shown in FIG. 2. In this case a load step occurs, as shown in the first panel.

The output voltage then falls, and the phase responds by turning on the high-side device causing the current in the coil to rise.

The ideal rate of increase of current in the coil is shown by the dashed trace in the third panel. If this rate was sustained then the corresponding voltage drop is indicated by the dashed line in the second panel.

However, each cycle the NMOS is turned on for a short duration (normally enforced by a fixed minimum on-time). This action then reduces the effective ramp rate of the current in the coil. This then leads to an increased voltage drop.

In the asymmetric multiphase buck architecture described above there are "slow" phases and "fast" phases. The slow phases are optimized for low-load efficiency and are populated with large value inductors. The fast phases are optimized for load transient response and are populated with low value inductors.

In the event of a load step the fast phases will try to ramp up their coil currents quickly. The slow phases will also try to ramp up their coil currents, but may take much longer to do so (an order of magnitude longer).

While the slow phases are trying to ramp up their currents the slave phases could "fill in" for the missing current.

Figure 3:
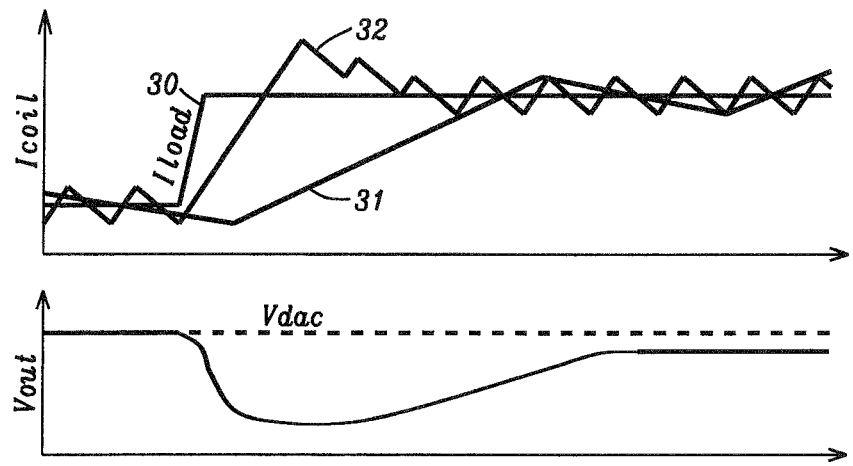
FIG. 3 illustrates how the slave phases could "fill in" for the missing current while the slow phases are trying to ramp up their currents.

This behavior is shown in FIG. 3. Here the load step 30 is shown (not the scale of the load step is half that of the coil currents to allow simpler comparison of total currents). The coil current 31 is that of the "slow" master phase. The coil current 32 is that of the "fast" slave phase. Ideally the fast phase would ramp the coil current up directly to a high level to supply all the required current. At this point the master phase current is only at a low value, and so the fast phase must supply much more than it would do in the static condition.

However, the slave phases operate in valley mode, and so their current ramp rate may be slower than ideal. If the effective ramp rate of the fast phase is compromised by the valley mode enforced NMOS transistor on time, then the load transient response (output voltage drop) will be impacted.

It has to be understood that once a load step occurs the output voltage of the buck will fall. If the load step can be detected in some way the current in the coils can be ramped up to meet the load. This will arrest the fall of the output voltage and the buck converter comes back into regulation. This detection of the load step improves significantly a load transient response.

In the hybrid buck converter architecture used we have "slow" phases and "fast" phases. Both sets of phases must ramp their output current to meet the load requirement. Until the "slow" phases reach their final current level the buck is operating in a relatively extreme condition and is still trying to cope with a load transient event.

The buck converter will have to react as quickly as possible to any changes in conditions during this time it is reasonably to relax normal operating conditions to allow the buck converter to respond quicker. For example, as the output voltage is already lower than in normal regulation, the ripple voltage may not be as important.

If the clock rate of the "fast" phases is reduced then they can ramp up the current in their inductors at a higher effective rate while the "slow" phases are still ramping up their coil currents.

Figure 4:
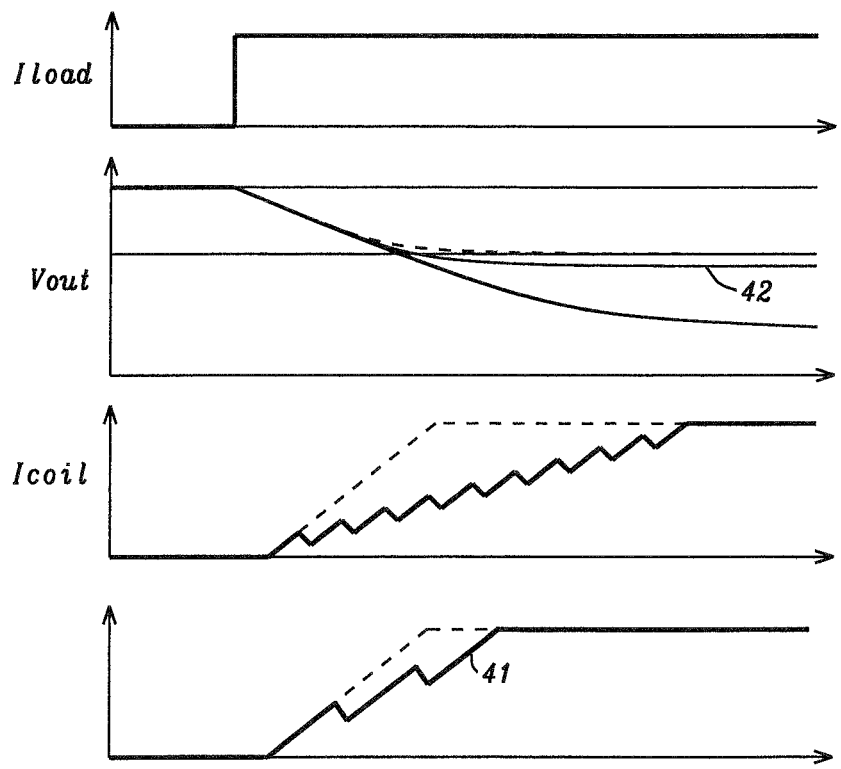
FIG. 4 depicts how the fast phases can ramp up the current in their inductors at a higher effective rate while the "slow" phases are still ramping up their coil currents if the clock rate of the "fast" phases is reduced.

This is shown in FIG. 4 below where trace 41 on the fourth panel indicates the coil current if the frequency is halved, but the minimum NMOS on-time is held constant. The coil current 41 reaches its final level much quicker than in the scenario without load step detection. The final load transient response of the output voltage is also indicated in trace 42 on the second panel.

This disclosure teaches that, once a load step is detected (a "panic" signal is raised) the clock frequency is reduced. The slower clock frequency is maintained until one (or some combination of) the "slow" phases has reached its final value.

In the buck of the present disclosure the high-side device (PMOS) of the "slow" phases must be turned on to ramp up the coil current. This high-side device is turned off by a peak current limit. It is therefore convenient to enable the clock frequency reduction using the "panic" signal, and to return the clock frequency to its normal rate when the "slow" phase hits its current limit.

FIG. 5 shows how the scheme might work. The top panel shows the situation without load step detection. In this case the load occurs and the coil current of the "slow" phase 51 starts to ramp immediately towards its final level. The current of the "fast" phase 52 also rises, but must turn the low-side NMOS on each clock cycle, reducing the effective ramp rate.

The second panel shows the case with the load step detection disclosed. Once the load step occurs it is detected and the clock rate is halved. This allows a greater effective ramp rate for the current in the coil. The two dashed lines indicate where the total output current of the buck has matched the load current. The right-hand dashed line indicates where the first scenario reaches the load current, and the left-hand dashed line indicates where the coil currents match the load with the load step detection disclosed. The case with the load step detection disclosed is quicker to match the load current, and would therefore have better load transient response.

The third panel shows the time period for which the clock would be halved.

Other clock divide ratios are possible, and would have a similar beneficial effect.

FIG. 6 shows a block diagram of a preferred embodiment of the disclosure. It shows an embodiment having two slow and two fast phases including a load detection unit 61.

While the invention has been particularly shown and described with reference to the preferred embodiments thereof, it will be understood by those skilled in the art that various changes in form and details may be made without departing from the spirit and scope of the invention.

What is claimed is:

1. Method to improve load transient response of a switched multiphase buck converter, comprising:
   (1) providing a switched multiphase DC-to-DC converter, comprising one or more fast phases with inductors having low inductance, one or more slow phases with inductors having higher inductance, compared to the fast phases, having relative high inductance, a circuit to detect if an output current of a slow phase has reached a maximum limit, a load step detection unit to detect if a load step at the output of the DC-to-DC converter has occurred and a frequency divider unit, which is configured to reduce a clock frequency;
   (2) reducing a clock frequency of said one or more fast phases upon detection of a load step; and
   (3) returning said clock frequency to its normal rate once a current in said one or more fast phases reaches a predetermined level.

2. The method of claim 1, further comprising:
(1) providing a switched multiphase DC-to-DC converter, wherein all phases comprise a high-side and a low-side output power transistor;
(2) checking, if the load step detection unit detects a load step at the output of the DC-to-DC converter and, if it so, go to step (4), else go to step (3);
(3) continue with operation of the DC-to-DC converter according to actual load situation and go back to step (2);
(4) setting a panic signal, which is reacting quickly to a load step, by the load step detection unit hence initiating a reduction of the frequency of the clock controlling the fast phases of the DC-to-DC converter in order to accelerate ramping currents in the fast phases;
(5) turning on the high-side transistors of the slow phases of the DC-to-DC converter until one or more coil currents of the slow phases reach a maximum limit;
(6) returning to normal clock frequency when the one or more coil currents of the slow phases have reached their maximum limit; and
(7) go back to step (2).

3. The method according to claim 2, wherein the frequency of the clock is halved in case of the panic signal.

4. The method according to claim 1, wherein each inductor of all phases is connected between a node connected between the high-side and the low-side transistor of the correspondent phase and an output of the hybrid buck converter.

5. The method according to claim 1, wherein the fast slave phases are controlled by a valley current control scheme, which is characterized by turning on the low-side transistor and turning off the high-side transistor of the fast slave phases by clock edges and turning off the low-side transistor of the fast slave phases and turning on the high-side transistor of the fast slave phases by a control loop.

6. The method according to claim 1, wherein the slow controlled phases are controlled by a peak current limit.

7. The method according to claim 1, wherein the number of phases enabled at any time is dependent on the total output current of the DC-to-DC converter.

8. A multiphase switching DC-to-DC converter with improved load transient response, comprising:
one or more fast slave phases with inductors having low inductance; and
one or more slow slave phases with inductors, compared to the fast slave phases, having relative high inductance;
wherein said multiphase switching converter is configured to reduce a clock frequency of said one or more fast phases upon detection of a load step, and to return said clock frequency to its normal rate once a current in said one or more fast phases reaches a predetermined level.

9. The multiphase switching DC-to-DC converter with improved load transient response of claim 8, further comprising:
a master phase comprising a high-side output transistor, a low-side output transistor and an inductor which is connected between a mid-point between both output transistors of the master phase and an output port of the DC-to-DC converter;
one or more slow slave phases, wherein each slow slave phase comprises a high-side output transistor, and a low side output transistor and wherein the inductor is connected between a mid-point between both output transistors of the slow slave phase and the output port of the DC-to-DC converter;
said one or more fast slave phases, wherein each fast slave phase comprises a high-side output transistor, and a low side output transistor and wherein the inductor is connected between a mid-point between both output transistors of the slow slave phase and the output port of the DC-to-DC converter;
a current sensing means configured to detect if an output current of the one or more slow phases has reached a maximum limit;
a load step detection unit configured to detect if a load step at the output of the DC-to-DC converter has occurred and to provide a panic signal, which is reacting quickly to a load step, by the load step detection unit, and
a frequency divider unit, which is configured to receive the panic signal, to reduce a clock frequency in case a load step has occurred and to return said clock frequency to its normal rate once the current sensing means have detected that the output current of one or more peak-mode controlled phases has reached a maximum current limit.

10. The multiphase switching DC-to-DC converter according to claim 9, wherein the fast slave phases are controlled by a valley current control scheme, which is characterized by turning on the low-side transistor and turning off the high-side transistor of the fast slave phases by clock edges and turning off the low-side transistor of the fast slave phases and turning on the high-side transistor of the fast slave phases by a control loop.

11. The multiphase switching DC-to-DC converter according to claim 9, wherein the slow phases are controlled by a peak current limit.

12. The multiphase switching DC-to-DC converter according to claim 8 wherein the frequency of the clock is halved in case of the panic signal.

13. The multiphase switching DC-to-DC converter according to claim 8, wherein the number of phases enabled at any time is dependent on the total output current of the DC-to-DC converter.

14. A multiphase switching DC-to-DC converter with improved load transient response, comprising:
multiple phases comprising
one or more fast slave phases with inductors having low inductance; and
one or more slow slave phases with inductors, compared to the fast slave phases, having relative high inductance;
wherein said multiphase switching converter is configured to reduce a clock frequency of one or more of said multiple phases upon detection of a load step, and to return said clock frequency to its normal rate once a current in said one or more of said multiple phases reaches a predetermined level.

15. The multiphase switching DC-to-DC converter according to claim 14, wherein a panic signal upon detection of a load step, initiates the clock frequency reduction.

16. The multiphase switching DC-to-DC converter according to claim 14 wherein the frequency of the clock is halved in case of the panic signal.

17. The multiphase switching DC-to-DC converter according to claim 14, wherein the number of phases enabled at any time is dependent on the total output current of the DC-to-DC converter.

* * * * *